(12) United States Patent
Helmuth et al.

(10) Patent No.: US 11,512,995 B2
(45) Date of Patent: Nov. 29, 2022

(54) FLOOD SENSING SYSTEM AND METHOD

(71) Applicant: INTELLISENSE SYSTEMS, INC., Torrance, CA (US)

(72) Inventors: Ian Helmuth, Long Beach, CA (US); Christopher Ulmer, San Pedro, CA (US); David Miller, San Pedro, CA (US); Anthony Michael, Los Angeles, CA (US); Gregory Peng, Long Beach, CA (US); Jeffrey Norell, Los Angeles, CA (US); Josefino Del Rosario, Long Beach, CA (US); Samuel Ferguson, Los Angeles, CA (US); Matthew Barnhart, Long Beach, CA (US); Christopher Williams, Anaheim, CA (US)

(73) Assignee: INTELLISENSE SYSTEMS, INC., Torrance, CA (US)

( * ) Notice: Subject to any disclaimer, the term of this patent is extended or adjusted under 35 U.S.C. 154(b) by 434 days.

(21) Appl. No.: 16/598,893

(22) Filed: Oct. 10, 2019

(65) Prior Publication Data
US 2021/0108955 A1  Apr. 15, 2021

(51) Int. Cl.
*G01F 23/18* (2006.01)
*H02S 20/20* (2014.01)
(Continued)

(52) U.S. Cl.
CPC ............... *G01F 23/18* (2013.01); *G01W 1/14* (2013.01); *H02S 20/20* (2014.12); *H02S 40/38* (2014.12)

(58) Field of Classification Search
None
See application file for complete search history.

(56) References Cited

U.S. PATENT DOCUMENTS

| 4,602,344 A | 7/1986 | Ferretti et al. |
| 4,827,762 A | 5/1989 | Hasselmann |

(Continued)

FOREIGN PATENT DOCUMENTS

| AU | 2019100293 A4 * | 6/2019 | ............ G01F 23/14 |
| JP | 2855423 B2 | 2/1999 | |

(Continued)

OTHER PUBLICATIONS

Mattern, et al. "From the Internet of Computers to the Internet of Things." From active data management to event-based systems and more. Springer, Berlin, Heidelberg (2010) K. Sachs, I. Petrov, and P. Guerrero (Eds.): Buchmann Festschrift, LNCS 6462, pp. 242-259.

(Continued)

*Primary Examiner* — Peter J MacChiarolo
*Assistant Examiner* — Jermaine L Jenkins
(74) *Attorney, Agent, or Firm* — Sheppard, Mullin, Richter & Hampton LLP

(57) ABSTRACT

Systems and methods for accurate measurement and transmission of water level parameters during weather events, such as floods, are provided. The solid-state system can effectively measure water level without utilizing moving parts, pumps, or floats and may implement an improved water level determination method that compensates for inherent sources of error. Additionally, the system may be comprised of a network of sensor units that can communicate weather measurements wirelessly via a hybrid mesh network consisting variously of wireless terrestrial radio, cellular, and satellite communication links. By doing so, the status of water level and other environmental parameters may be reported in real time to first responders and emergency planners.

16 Claims, 10 Drawing Sheets

(51) Int. Cl.
*H02S 40/38* (2014.01)
*G01W 1/14* (2006.01)

(56) References Cited

U.S. PATENT DOCUMENTS

| | | |
|---|---|---|
| 5,791,187 A | 8/1998 | Chang |
| 9,784,887 B1 | 10/2017 | Ulmer et al. |
| 11,187,568 B2 * | 11/2021 | Lee .......................... G01F 23/18 |
| 2008/0129495 A1 | 6/2008 | Hitt |
| 2019/0116474 A1 | 4/2019 | Dridan et al. |

FOREIGN PATENT DOCUMENTS

| | | |
|---|---|---|
| KR | 10-0185260 | 5/1999 |
| KR | 2006-0025450 | 3/2006 |

OTHER PUBLICATIONS

International Search Report and Written Opinion dated Dec. 15, 2020 for International Application No. PCT/US2020/046508 filed Aug. 14, 2020.

* cited by examiner

FLOOD SENSING SYSTEM AND METHOD

STATEMENT OF RIGHTS TO INVENTIONS MADE UNDER FEDERALLY SPONSORED RESEARCH

This invention was at least partially made with Government support under contracts HSHQDC-16-C-00075 and HSHQDC-17-C-00020 awarded by the U.S. Department of Homeland Security. The Government may have certain rights in the invention(s) described herein.

TECHNICAL FIELD

The disclosed technology relates generally to the area of flood sensor systems. More specifically, some embodiments of the disclosed technology relate to distributed wireless, large-area, sensor systems that may be used for the measurement and reporting of water level. Various embodiments of the disclosed technology also relate to the field of study referred to as "internet-of-things" by which not just computers but smaller, less powerful modules can communicate information and sensor data via the internet and internet-connected networks.

DESCRIPTION OF RELATED ART

Flooding is the costliest type of natural disaster in the United States in terms of both loss of life and property. Over the last 30 years, the average losses from flood events in the United States have included approximately 90 fatalities and $8 billion in damages per year and there are thousands of counties that have declared 10 or more flood emergencies over that period. Providing planners and first responders with timelier and more accurate flood information can minimize the losses incurred when flood events occur.

Existing flood sensing systems are too expensive in terms of both equipment and installation to adequately meet the demands of planners and first responders. At a typical cost of approximately $20,000 for equipment and installation, current sensor systems cannot be installed in sufficient numbers and with suitable density to give planners and first responders the information they need to effectively manage and mitigate flood events. Presently, the technology space fails to contain a flood sensing system that is low-cost, easy-to-install, capable of flexible wireless networking options, and rugged enough to operate outdoors for extended periods.

BRIEF SUMMARY OF EMBODIMENTS

To address shortcomings of the current art, embodiments of the technology described herein achieves accurate and consistent measurement of water depth either from the surface level of the water being measured to the position of the submerged sensor, or relative to an external reference point. Various embodiments of the flood sensing unit do not utilize moving parts, pumps, or floats for measurement and can therefore be considered fully solid-state. The system further compensates for changes in atmospheric barometric pressure in a solid-state fashion and through means of a water-level determination algorithm. Moreover, flood readings from the network of flood sensor units can be communicated wirelessly via a hybrid mesh network consisting variously of wireless terrestrial radio, cellular, and satellite communication links.

The presently disclosed technology is described hierarchically beginning at the level of individual hardware modules, then moving to co-located modules forming a unit, and lastly, finishing at a comprehensive network of units forming a system. For the purposes of clarity, the individual hardware modules and their associated firmware will be referred to as modules, notably the submerged sensor module, main controller module, internet-of-things module, mounting plate module, etc. In instances, these modules combine to form a complete unit, they will be referred to as the flood sensor unit. Additionally, where these units connect via a wireless mesh with the associated software for control, data collection, and display, they form the disclosed system.

Various embodiments of the presently disclosed technology may include flood sensing unit comprising: a lower body portion coupled to a first power source, wherein the lower body portion comprises a controller, a first pressure sensor, and a transceiver; an upper body portion coupled to a second power source and releasably disposed on the lower body portion, wherein the upper body portion comprises a means to communicate information via a network; and the controller of the lower body portion is configured to be connected to a second pressure sensor that is submerged under water.

Another example embodiment can be a flood sensing system comprising: a housing comprising a base configuration comprising a transceiver, a first power source and a controller module, the housing further configured to releasably mount to a substrate structure via a mounting plate module, the controller module configured to receive flood data from a plurality of inputs comprising a pressure sensor input and at least one of a camera module input, an auxiliary power input, and a SDI-12 compatible device input; a communications module configured to releasably couple to the housing, the communications module comprising a second power source and configured to transmit and receive satellite or cellular communications; and one or more flood sensing units configured to receive the flood data from the housing via the transceiver, each flood sensing unit having a transceiver configured to transmit and receive line-of-sight mesh radio communications.

A further embodiment describes a method for measuring water depth, comprising: receiving, at a flood sensing unit, at least one atmospheric pressure measurement from a first sensor; receiving, at the flood sensing unit, at least one submerged pressure measurement from a second sensor; determining, via the flood sensing unit, a provisional water depth measurement based on the at least one atmospheric pressure measurement and the at least one submerged pressure measurement; receiving, at the flood sensing unit, at least one water surface pressure measurement from the second sensor; calculating, via the flood sensing unit, a calibration factor based on the at least one water surface pressure measurement, the at least one atmospheric pressure measurement, and the at least one submerged pressure measurement; applying, via the flood sensing unit, the calibration factor to the provisional water depth measurement; and determining, via the flood sensing unit, an adjusted water depth based on the applied calibration factor.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the present disclosure to the precise form disclosed. It should be understood that the disclosed technology can be practiced with modification and alteration, and that the disclosed technology be limited only by the claims and the equivalents, thereof.

DETAILED DESCRIPTION OF THE EMBODIMENTS

The presently disclosed technology can be for a flood sensor network consisting of a plurality of flood sensor units. The flood sensor units may be generally uniform, or may each be configured slightly differently, with different optional modules included. Regardless of precise configuration, the network of flood sensor units communicates via a line-of-sight wireless mesh radio network so that all units in the network maintain data connectivity. In general, most of the flood sensor units in the network will be of the base-level configuration and will possess line-of-sight radio communications capability; however, one or more flood sensor units in the network will be configured is an internet-of-things unit that provides an external connection out to the internet either via satellite or cellular radio. The combination of low-cost line-of-sight radio networking and backhaul capability using satellite or cellular internet connectivity provides internet connectivity to all flood sensor units in a cost-effective manner with available redundancy for both the line-of-sight links and for the backhaul links.

During normal operation, the flood sensing units power up at regular intervals to measure water level and other environmental parameters and report that status to a central server with software that is tailored for use by first responders and emergency planners. In addition to reading of environmental conditions, some or all units in a network may be configured with optional cameras that can be commanded to capture imagery to provide greater fidelity of flood conditions. The modularity of the system design (both at the unit and system levels) allows for additional sensor modules outside of the scope of the presently disclosed technology to be monitored in real time.

Figure 1:
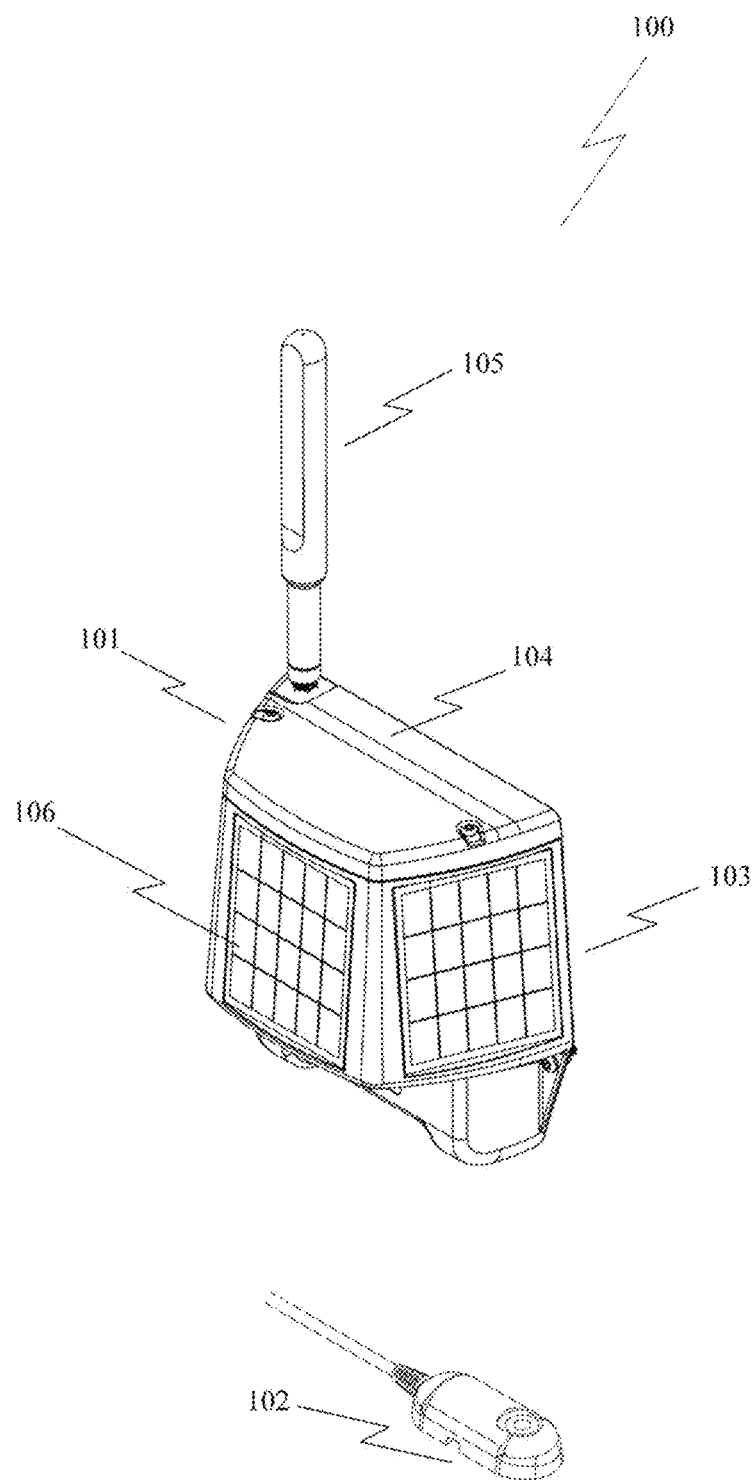
FIG. 1 illustrates an example base-level controller module with line-of-sight radio communications capability as well as the external, submerged sensor module of the flood sensing unit, in accordance with various embodiments.

FIG. 1 illustrates an example base-level controller module with line-of-sight radio communications capability as well as the external, submerged sensor module of the flood sensing unit, in accordance with various embodiments. Referring to FIG. 1, the base-level configuration of the flood sensor unit, 100, may include a main controller module, 101, which can be designed for permanent installation at a location above flood level, and the submerged sensor module, 102, which can be designed for installation below flood level and measures water level while submerged. The submerged sensor normally connects to the main controller module via a 50-ft cable that carries power and data, but an extender cable can be added for additional length. Furthermore, by purposely designing the submerged sensor with a fast start-up time, low power consumption, and sufficient on-board power supply capacitance, the submerged sensor can be powered remotely from the main controller over more than 200 ft of cable. The main controller module may consist of a primary plastic enclosure, 103, and a top cover plate, 104, which can be attached with screws to protect an auxiliary connector for attachment of optional communications modules. The main controller module may also include a radio antenna, 105, for transmission and reception of signals for line-of-sight mesh radio communications. Internal components within the enclosure can include electronics and a battery pack that is powered by external solar cells, 106, that maintain charging on the batteries by harvesting available solar insolation.

Figure 2:
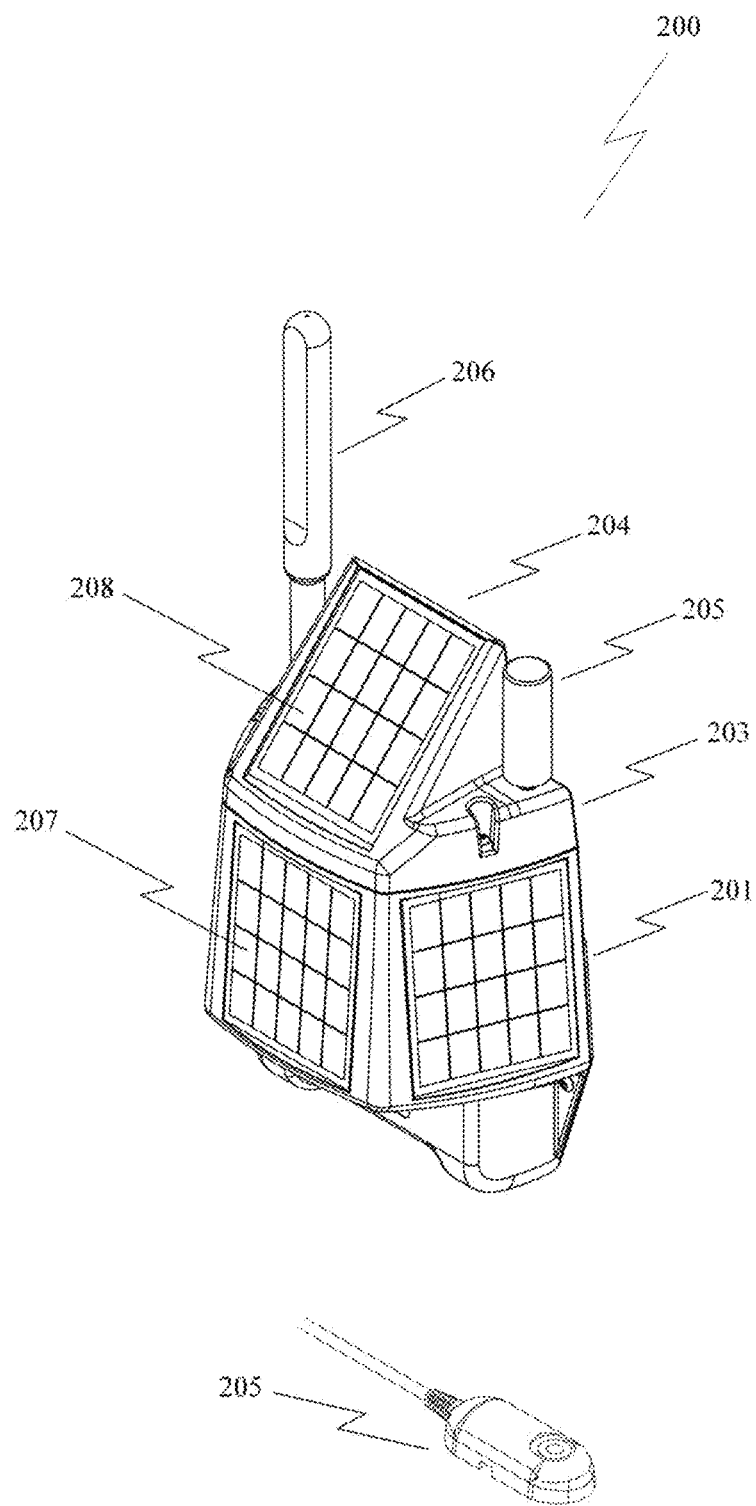
FIG. 2 illustrates an example advanced-level controller module with line-of-sight radio plus secondary wireless communications capability as well as the external, submerged sensor module of the flood sensing unit, in accordance with various embodiments.

FIG. 2 illustrates an example advanced-level controller module with line-of-sight radio plus secondary wireless communications capability as well as the external, submerged sensor module of the flood sensing unit, in accordance with various embodiments. Referring to FIG. 2, the internet-of-things configuration of the flood sensor unit, 200, is similar to the base level configuration, 100, except for the addition of the internet-of-things module that provides one of two additional communications means, either satellite or cellular. This internet-of-things configuration may include a main controller module, 201, which can be designed for permanent installation at a location above flood level, and the submerged sensor module, 202, which can be designed for installation below flood level and measures water level while submerged. This configuration utilizes the same primary plastic enclosure, 203, as the base level configuration but instead of a top cover plate, it includes the internet-of-things module, 204, which connects to the internal auxiliary connector and is attached with screws. The internet-of-things module may include its own antenna, 205, for handling of satellite or cellular communications signals, while the main controller also includes a radio antenna, 206, for transmission and reception of signals for line-of-sight mesh radio communications. Internal components can be the same for the base-level configuration and the internet-of-things configuration including electronics and a battery pack that is powered by external solar cells, 207, that maintain charging on the batteries by harvesting available solar insolation. The internet-of-things module may also include its own solar cell to contribute additional power to the battery in the main controller unit, thereby offsetting its additional power draw. By generalizing the mechanical interface between the main controller and any potential internet-of-thing access device, the system can develop new potential communications paths in the future. This configuration was achieved through multiple iterations of different configurations involving multiple units, internal modularity, and external modularity. Moreover, based on an analysis of cost, power, and ease of installation the configuration described herein was found to be advantageous by requiring the fewest number of individually mounted units while also providing the maximum versatility of communications options.

Figure 3:
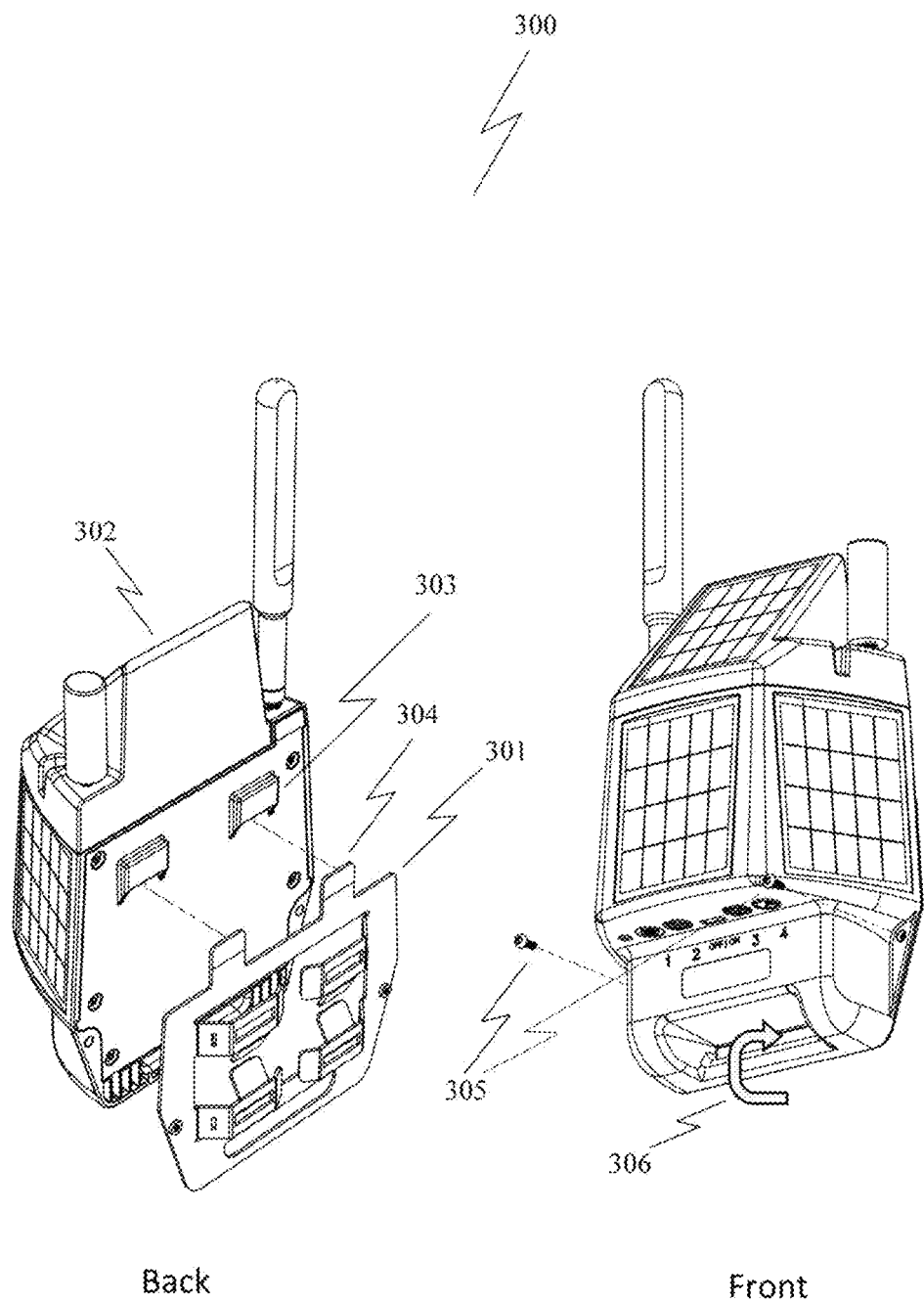
FIG. 3 illustrates a mechanical mounting system for the flood sensing unit including the mounting plate module and its mechanical security feature, in accordance with various embodiments.

FIG. 3 illustrates a mechanical mounting system for the flood sensing unit including the mounting plate module and its mechanical security feature, in accordance with various embodiments. Referring to FIG. 3, an additional feature of the mechanical design of the flood sensor unit that can be applicable to both the base-level and internet-of-things configurations is the mounting plate module and associated connection and security system, 300, that enables easy, versatile, and secure mounting of the flood sensor units. Specifically, in the embodiment illustrated, the mounting plate, 301, is mounted first to the substrate structure used for mounting. The substrate structure could be a building, pole, fence post, tree, bridge, or other fixed object to which the flood sensor unit will mount. By utilizing a method in which the mounting plate is mounted in isolation, without the flood sensor unit, can make mounting easier due to the light weight, and simplicity of the mounting plate. For example, field installers are not required to hold or position any the flood sensing equipment while attempting to drive screws or other anchors. Instead, they may mount the light weight and simple mounting plate using any number of approaches including screws, anchors, straps, adhesives, etc. After the mounting plate is fully installed to the substrate structure the flood sensor main controller module, 302, can be slipped over the mounting plate module. Slipping the main controller module onto the mounting plate module may be achieved by aligning two pockets in the back of the main controller, 303, to the two metal tabs on the top of the mounting plate, 304. This simple means of attachment requires no fasteners to place the flood sensor unit, thereby reducing fatigue of the field installer. At no point is the weight of the flood sensor required to be supported while fasteners are driven; instead, the tabs are able to fully support the weight of the flood sensor once placed. After the flood sensor is resting fully on the tabs are the two attachment screws, 305, driven into the mounting plate to fully attach the flood sensor to the mounting plate. While the two screws are sufficient to hold the main controller to the mounting plate, an additional feature can be included in the design that provides further security and prevention of deliberate tampering. The security feature utilizes oblong, horizontal holes in both the main controller and the mounting plate that overlap when the main controller is mounted on the plate. One or more locks, or other mechanical security devices can then be threaded through the hole, 306, to prevent the main controller from being slipped off of the mounting plate, even if the two mounting screws are removed.

In some embodiments, another aspect to the flood sensor unit design can be the use of integral solar cells mounted in a near-vertical configuration, wrapped around the sides of the enclosure. These solar cells may be intended to face generally south (or north if the system is installed in the southern hemisphere) in order to capture as much light as possible. The solar panel comprises an arrangement of solar cells. In the example embodiments of FIGS. 1-3, the middle of the three solar cells on the main controller module (See FIGS. 1 and 2) may be intended to face south, the two solar cells on either side of the central cell can face approximately 30 degrees east and west, respectively, of the central cell facing due south. These cells can be mounted almost vertically, exhibiting an approximately 5 degree angle. Furthermore, the internet-of-things module can include an additional, fourth solar cell facing south (See FIG. 2) to provide more power for the internet-of-things radio.

Figure 4:
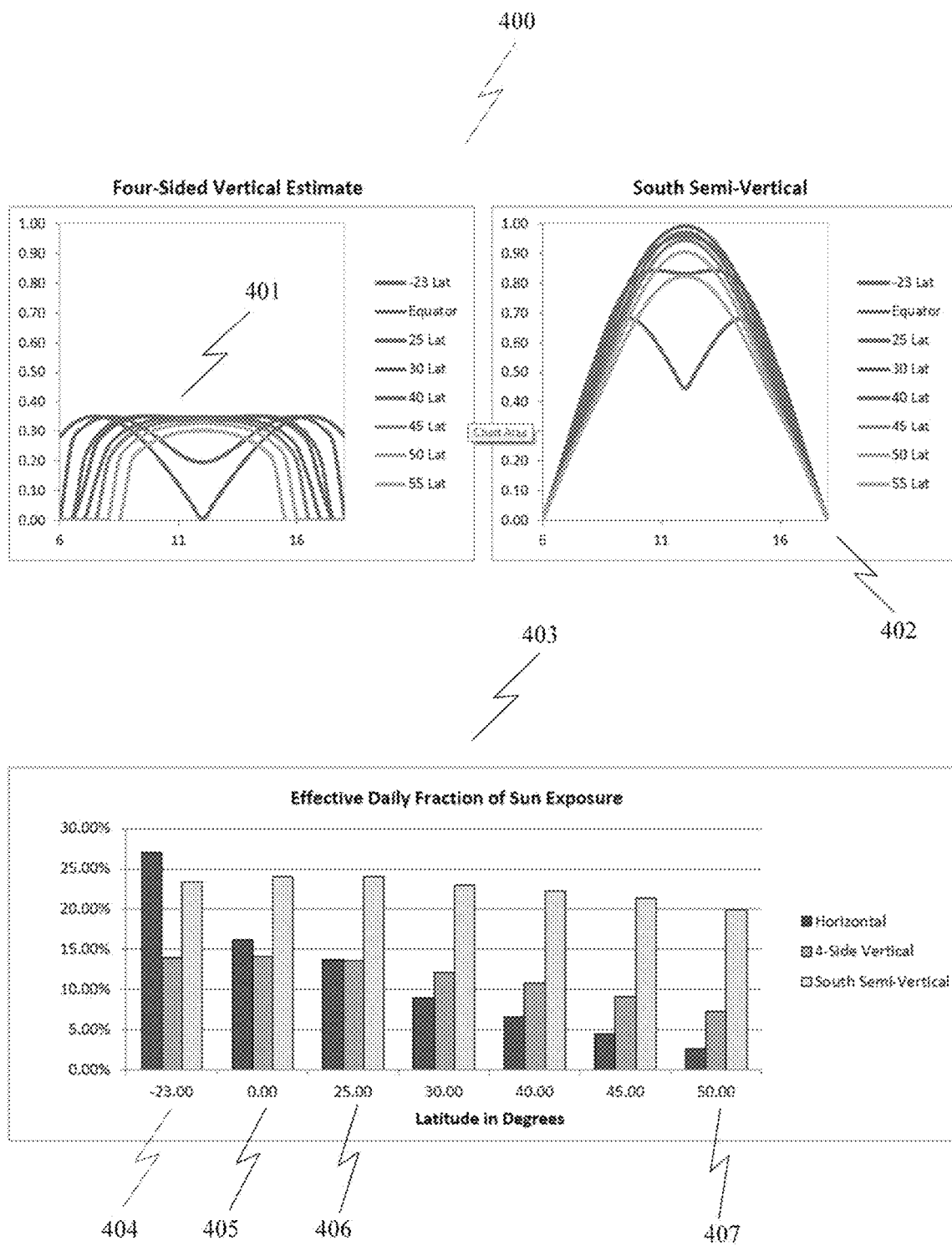
FIG. 4 illustrates solar performance of the solar panel arrangement, in accordance with various embodiments.

FIG. 4 illustrates solar performance of the solar panel arrangement, in accordance with various embodiments. Referring to FIG. 4, while it is intuitive and generally assumed that mounting solar cells more-or-less horizontal, on the top of a device, is advantageous, a detailed numerical analysis of solar insolation at different latitudes, 400, reveals that assumption to be faulty. This determination was derived from numerical curves generated to show the progression of the component of the sun vector that is perpendicular to the solar panels over the progression of hours through the day. These curves were generated for conditions during the winter solstice for two hypothetical arrangements of solar panels, the first being that of equal solar surfaces surrounding the perimeter of a solar collecting body, 401, and second, with south-facing-only solar panels, 402, on a single side of a solar collecting body. These curves show the fractional percentage of solar energy compared to fully orthogonal solar rays across all solar surface in the vertical axis. When theses curves are integrated over the course of the day at the simulated condition of the winter solstice, 403, the total sun-collecting capability of the horizontal base configuration, the fully surrounding near-vertical configuration, and the south-facing near-vertical configuration can be compared to one another. This comparison shows that the horizontal configuration is only superior in the sub-equatorial case, 404, where the sun passes straight overhead during the middle of the day. As latitude increases, to the equator, 405, the angle of the sun at the middle of the day is 23 degrees from vertical which impacts the efficiency curve of the horizontal solar panels but the efficiency of the south-facing panels retain greater integral collection ability. As the latitude increases further, 406, the horizontal configuration diminishes in efficiency the most, the south-facing configuration diminishes the least, and the four-sided configuration falls between the other two. The fullest effect of latitude on efficiency can be seen at the 50 degrees latitude case, 407, where the south-facing configuration shows greater efficiency that either of the other configurations at the winter solstice. This analysis shows that for a fixed solar panel configuration, where panels cannot move dynamically to track the sun, that near-vertical panels are superior to horizontal panels during worst-case solar conditions during mid-winter. Whereas fully surrounding solar panels can be advantageous when orientation of the panels cannot be positioned a priori, the south-facing case is superior when deliberate orientation of a system can be achieved to face solar panels to the south, as is the case with the flood sensing unit. Note that this analysis applies equally to installation in the southern hemisphere but with north and south orientations reversed.

Figure 5:
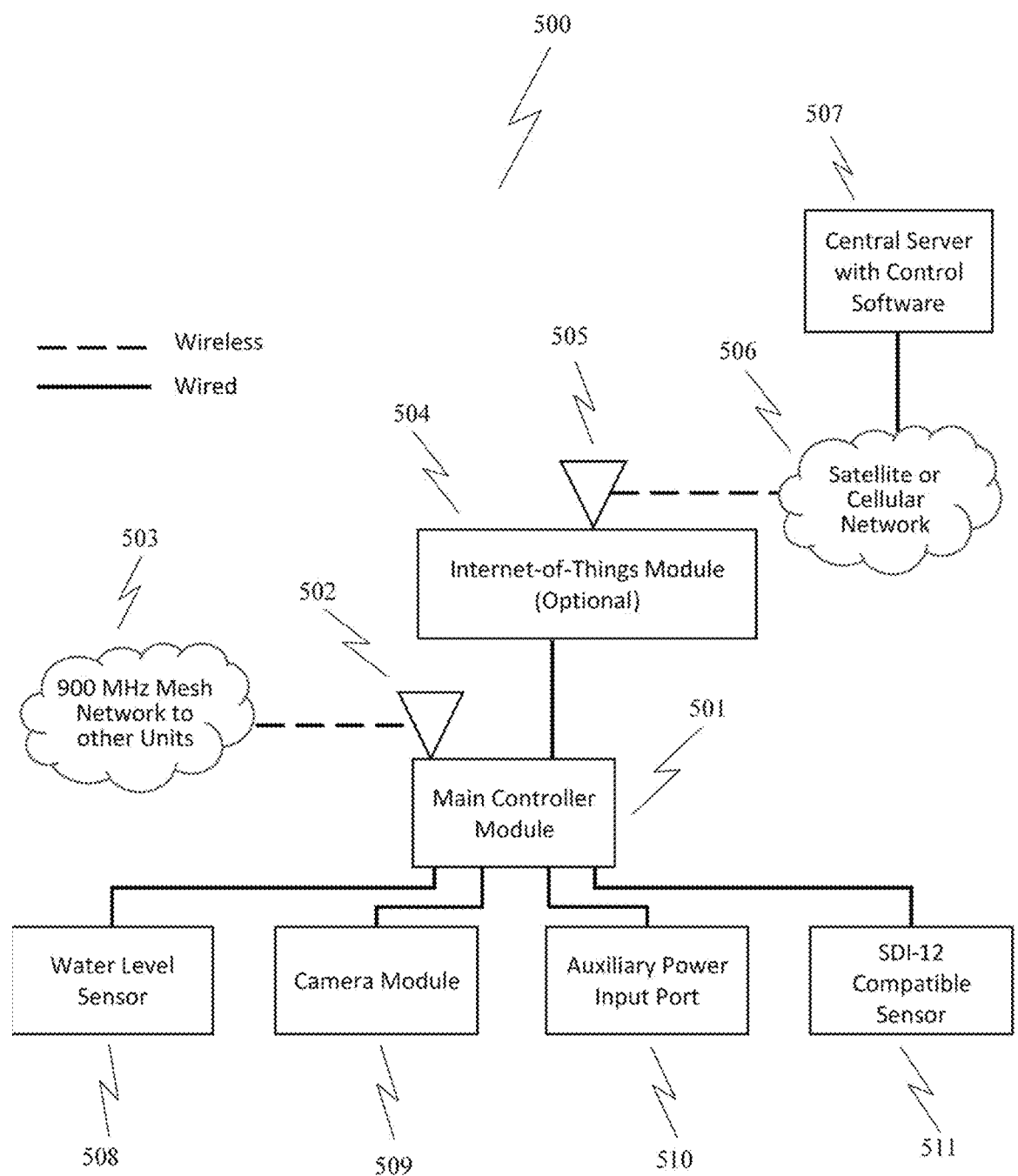
FIG. 5 illustrates the functional architecture of a flood sensor unit and its associated modular components, in accordance with various embodiments.

FIG. 5 illustrates the functional architecture of a flood sensor unit and its associated modular components, in accordance with various embodiments. Referring to FIG. 5, when examined on a functional basis, 500, the modularity of the flood sensor unit of the presently disclosed technology can be seen with its associated modules. At the heart of the flood sensor unit can be the main controller module, 501, which is the central processing and control element. This main controller module may include an antenna, 502, which is used to connect wirelessly to the mesh network, 503, of flood sensor units. An optional internet-of-things module, 504, which can contain its own radio and antenna, 505, to connect to the internet via either satellite or the cellular network, 506. While the internet-of-things module is optional for any particular flood sensor unit, in some instances the internet-of-things module is connected to at least one main controller in each network to provide internet connectivity from the flood sensors to the central controller software, 507, that receives water level data from the flood sensor units and sends commands to flood sensor units to control the operation of the units. By not requiring all units within a flood sensor network to have direct satellite or cellular connectivity, operational and total life cycle cost is reduced.

In addition to modularity with regard to the wireless connectivity within and outside of each flood sensor network, the unit supports modularity with regard to sensor input modules. In the illustrated embodiment, the primary sensor input can be the water level sensor input, 508. This input normally receives data from the submerged pressure sensor. When the pressure reading from under the water is algorithmically combined with the barometric atmospheric pressure that may be measured by the main controller itself, calibrated water depth can be assessed. While the submerged pressure sensor may be the primary sensor for water level measurement, the water level sensor input is not limited, and can support inputs from any type of water level sensing technology with a compatible digital interface. The main controller module can also include a camera module input, 509, that can be used to power and control and external camera. In addition to sensory inputs, the main controller may include an auxiliary power input port, 510, for installations where adequate solar access is insufficient to power the unit with the integrated solar cells. Finally, an industry-standard SDI-12 interface is available for powering SDI-12-compatible sensor devices, 511, that may include rain buckets, soil moisture, and other sensor modules.

Figure 6:
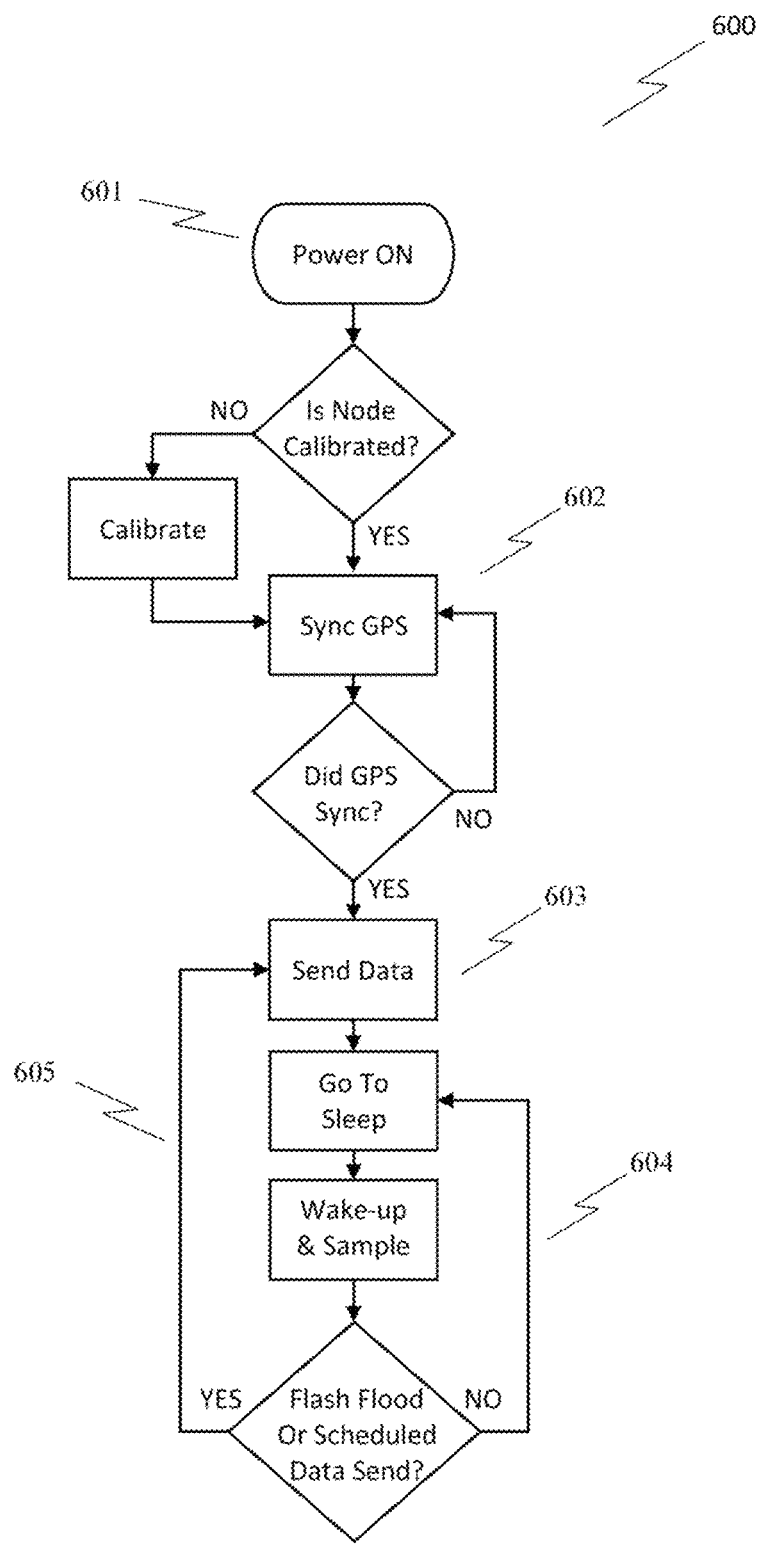
FIG. 6 illustrates the firmware architecture of a main controller module for control of attached modules and maintenance of data communication, in accordance with various embodiments.

FIG. 6 illustrates the firmware architecture of a main controller module for control of attached modules and maintenance of data communication, in accordance with various embodiments. Referring to FIG. 6, functionality of the main controller module, and therefore of the overall flood sensor unit, may be achieved through firmware within the main controller module. The functional architecture of the controller, 600, begins at power-up. Power-up, 601, usually occurs when the main controller module is first manually switched on after installation, but can also occur when the main controller module becomes powered automatically when the battery becomes sufficiently charged following a long, multi-day period of low solar power input energy. Although multi-day periods without solar input energy are rare, the system may include proper battery voltage monitoring with hysteresis to ensure that the system powers down cleanly and re-powers cleanly once the battery voltage falls below or rises above a predetermined level, respectively. Immediately after power-up, 601, the unit begins acquiring GPS (Global Positioning System) signals, 602, in order to accurately calibrate its internal time. The sensor units on a given network can be tightly synchronized so that all units can communicate during the same time interval and to hibernate between communications intervals in order to save power. Once the GPS signal has been acquired, the firmware enters an infinite cycle, 603, of repeated intervals of sleeping, 604, to save power, and active periods of measurement and communication, 605. As long as power can be maintained using available, collected solar energy, the flood sensor unit will continue to operate.

Figure 7:
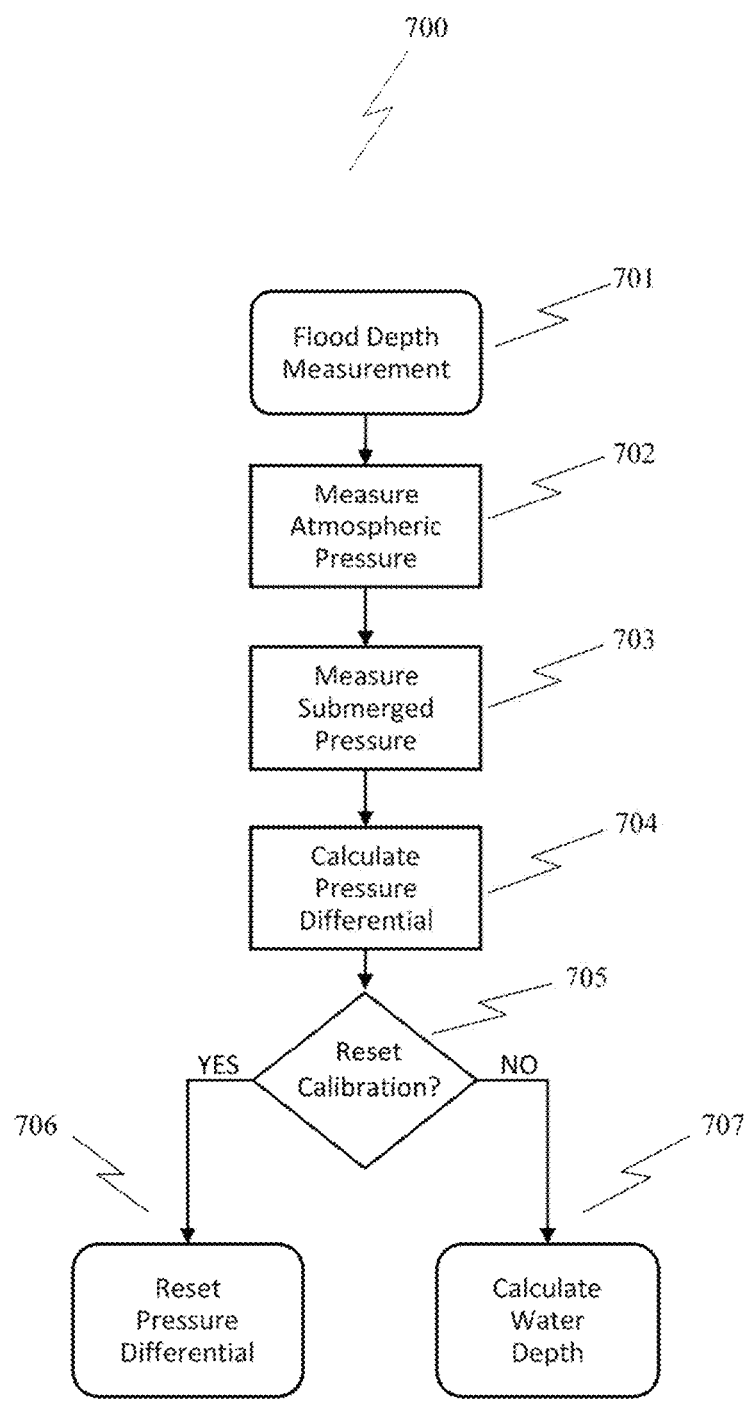
FIG. 7 illustrates the internal architecture of a main controller module, in accordance with various embodiments.

FIG. 7 illustrates the internal architecture of a main controller module, in accordance with various embodiments. Referring to FIG. 7, at a more detailed level, the act of the main controller to measure water depth using the attached, submerged pressure sensor, 700, may be achieved through an algorithm that incorporates atmospheric pressure measurement and submerged pressure measurement. When a water depth measurement is initiated, 701, a measurement of barometric pressure in the atmosphere may be taken first, 702. Next, a measurement of pressure can be made at the submerged pressure sensor, 703. The difference between these two pressure measurements, 704, can determine the preliminary height of water above the submerged pressure sensor. While it may ostensibly appear that the difference in pressures is then equal to the water height times the density of water, nevertheless, this is not precisely the case. Specifically, the difference in pressure divided by the density of water results in water height above the sensor, offset by the difference in air pressure between the water surface and the upper barometric pressure sensor. To remove the air pressure difference from preliminary water height measurement, an additional calibration step, 705, can be performed when the submerged pressure sensor is held at the water surface prior to being installed in its final submerged location. When this calibration is performed, 706, all sources of error including the difference in air pressure between the water and the fixed upper barometric air pressure sensor can be removed. Once the calibration factor is fixed, the regular calculations of subsequent water depth measurements, 707, result in accurate, absolute depth measurement from the surface of the water to the final location of the submerged pressure sensor.

Figure 8:
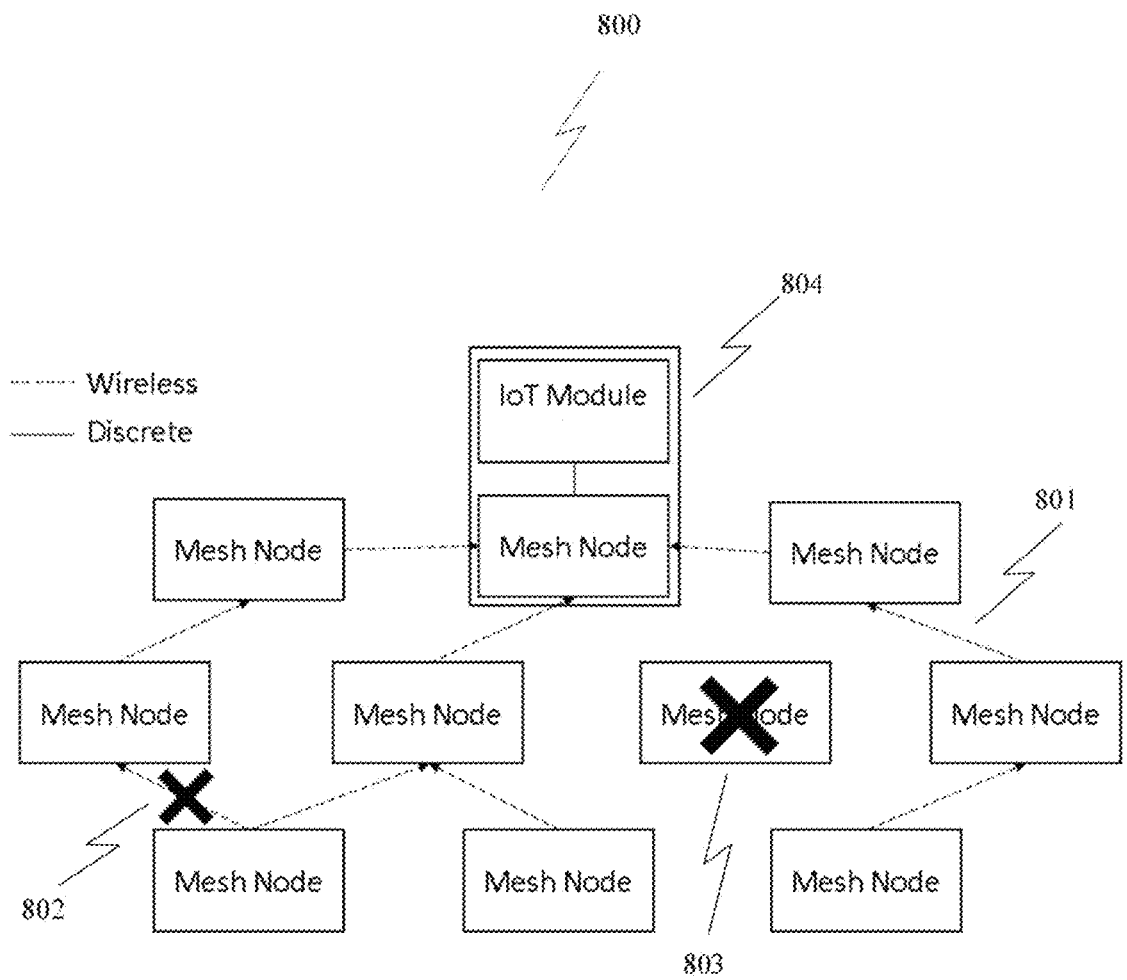
FIG. 8 illustrates a network architecture of the flood sensing system including the mesh radio network and external internet linkage, in accordance with various embodiments.

FIG. 8 illustrates a network architecture of the flood sensing system including the mesh radio network and external internet linkage, in accordance with various embodiments. Referring to FIG. 8, when viewed from an overall network level, 800, the inter-relationship between connected flood sensor units can be seen. As previously described, all flood sensor units may communicate with one another via a wireless mesh network. This mesh network may consist of individual point-to-point links, 801, that form multi-hop links from any unit to any other unit. Dynamic reconfiguration of the mesh enables re-organization of the multi-hop structure as desired in the event of any given link, 802, or unit, 803, being temporarily or permanently unavailable. In order for the mesh network to have connectivity to the internet, at least one flood sensor unit within the network can have an installed internet-of-things module, 804, that provides it with internet-enabled satellite or cellular data connectivity. The network architecture also supports more than one unit including an internet-of-things module to provide redundancy so that failure of one single unit cannot disable the entire mesh network.

Figure 9:
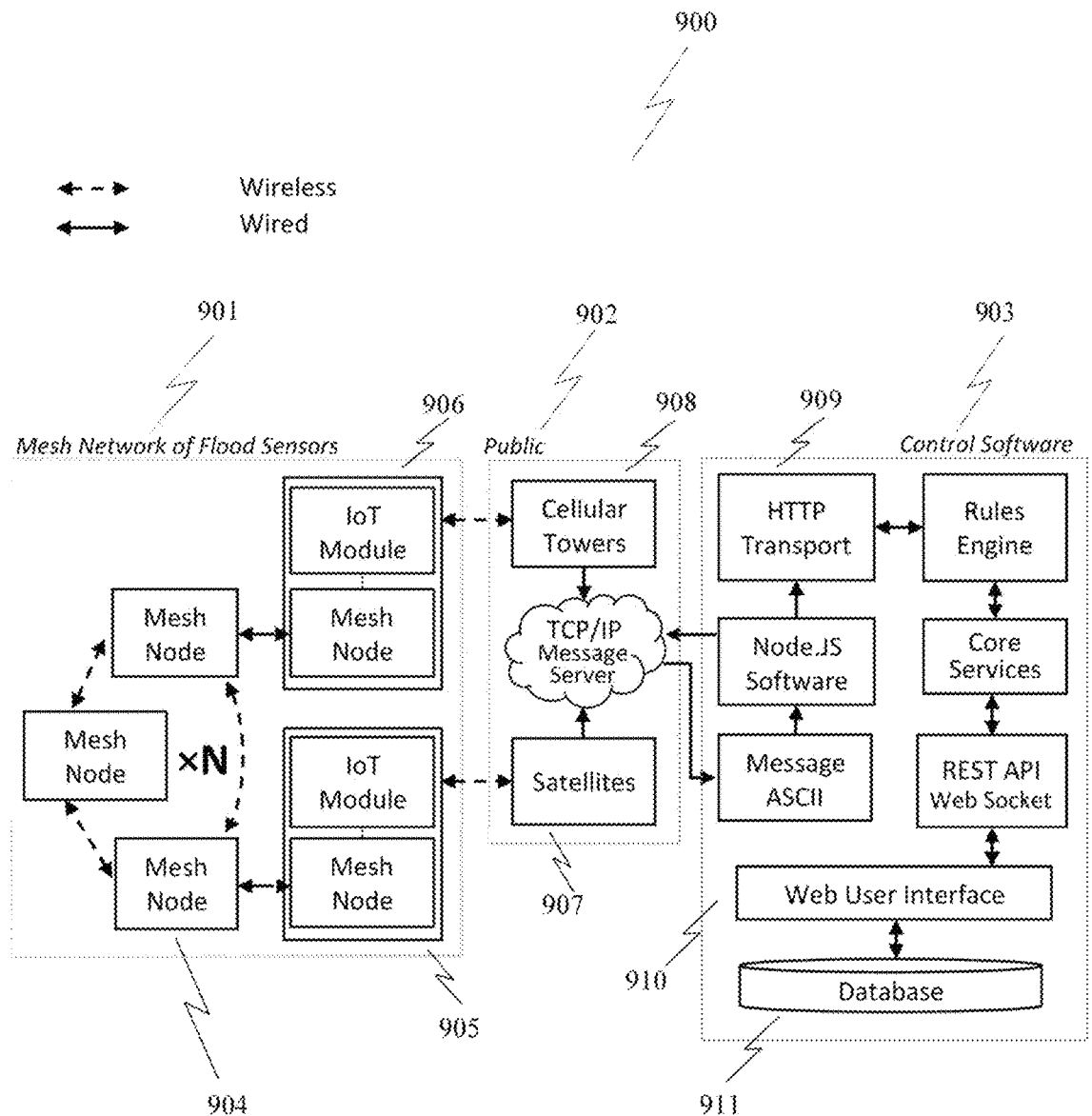
FIG. 9 illustrates a flood measurement and calibration algorithm utilized by the main controller module unit for determination of water depth, in accordance with various embodiments.

FIG. 9 illustrates a flood measurement and calibration algorithm utilized by the main controller module unit for determination of water depth, in accordance with various embodiments. Referring to FIG. 9, when viewed at both a network and software level, 900, the relationship between a mesh network as a whole, 901, the public Internet and data infrastructure, 902, and the control software, 903, that collects data from and sends commands to the devices in the mesh network can be understood. Within the mesh network, there can be any number of mesh nodes, 904, connected together to share collected data of water depth and other relevant hydrological parameters. At least one node in the network, 905, can also have an internet-of-things module that connects the mesh to the public Internet. Multiple nodes may have an internet-of-things modules in order to provide redundant back-haul with the same Internet access method or diverse access methods, 906. Specifically, the connection to the Internet can be achieved via satellite network provider, 907, or cellular network provider, 908. While the presently disclosed technology supports both methods, there is theoretically no limit to the number and type of available internet-of-things access modules that could be realized using the modular framework described herein.

Regardless of the means of access, all connectivity to the mesh network can be reduced to Internet traffic in the form of TCP/IP (Transmission Control Protocol/Internet Protocol) messages. For collection of data from the mesh network of flood sensors, these messages are delivered as raw binary data and then converted to ASCII data packets. Node.JS parses the ASCII data for satellite or cellular connections and then delivers the data through the HTTP transport layer, 909, into the rules engine. Within the rules engine, thresholds can be user-configured based on absolute levels or rates of change exceeding pre-defined thresholds as determined by settings within the core services module. In the illustrated embodiment, the web user interface module, 910, supports changes to user settings, displays new data collected through the web socket API (Application Programming Interface), and displays historical data maintained in a database, 911, as a unified view to the user. For sending commands to the mesh network to control modes or to capture images, the reverse path is followed.

Taken in total, all the modular and unit-level technologies in the presently disclosed technology work to achieve a low-cost network capable of reliably and rapidly reporting water level and flood conditions. With several improved elements such as measurement of both submerged pressure and atmospheric pressure, the modular architecture, and the power-generation configuration, the system is distinct from available high-cost solutions and will enable much broader application for the benefit of a wide range of flood prone communities and regions.

The embodiments described herein are based on pressure measurement as a means for determination of water depth. As noted in the disclosure, the flood sensing unit may be modular in its architecture and in its construction, and can therefore interface with non-pressure-based water level sensing units to form alternate embodiments. The main controller unit module can also accept inputs from sensor modules not related to water depth such as water flow sensors, water impurity measurement units, air quality measurement sensors, or environmental sensors for example, thereby creating additional embodiments of the sensing unit. The main controller can also be configured with an internet-of-things module thereby creating an added dimension for alternate embodiments of the flood sensing unit. The enclosure, mounting plate, and other mechanical components can be produced in various materials including metals and plastics and by various manufacturing techniques including casting, molding, stamping, and bending. The disclosure herein is not intended to be exhaustive as to all permutations and combination of modules that can be formed, nor the permutations of network structures allowable by this architecture. These embodiments are intended illustrative of the dimensions of modularity enabled by the disclosed architecture but not limiting of scope.

Figure 10:
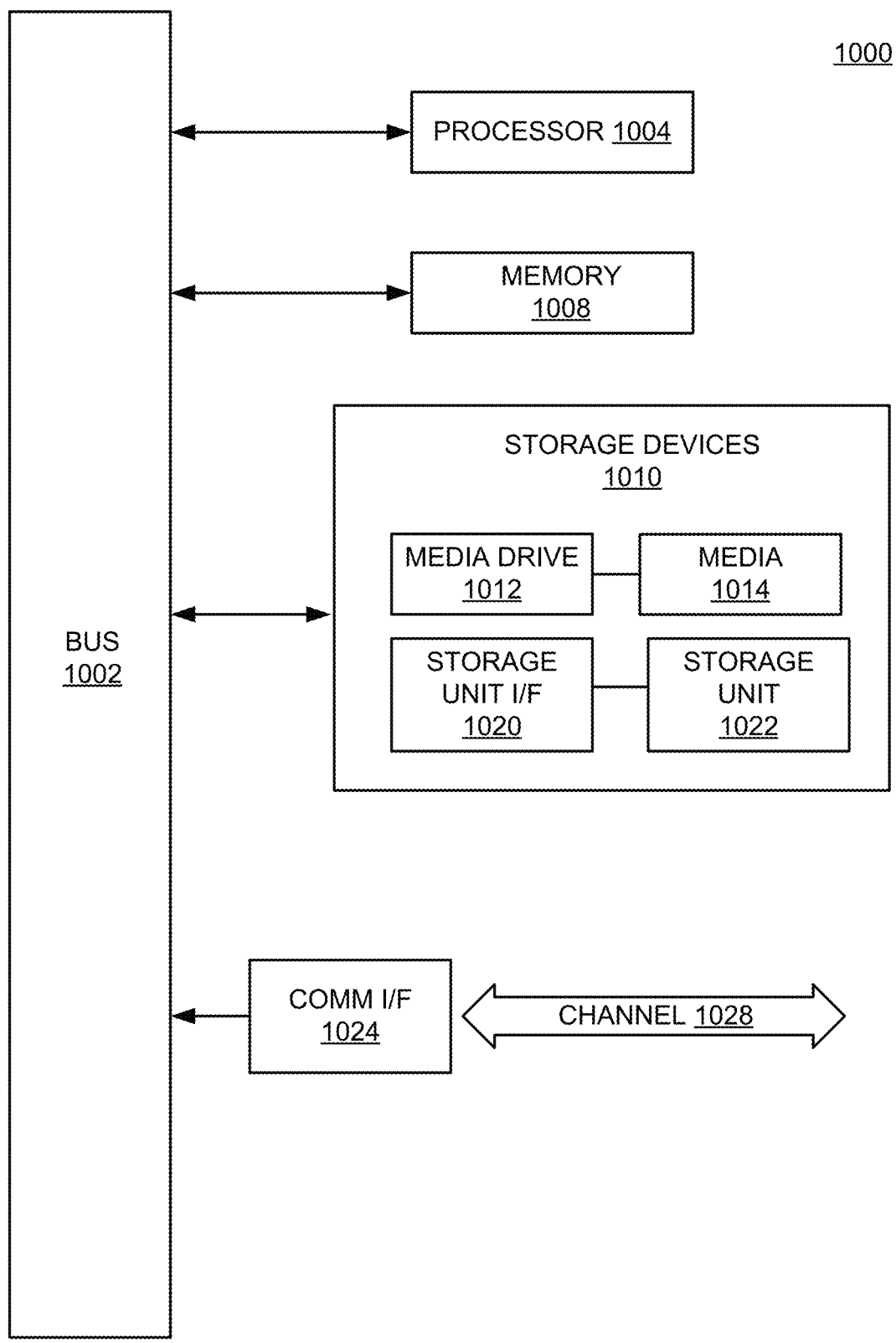
FIG. 10 illustrates an example computing module that may be used in implementing various features of various embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 10. FIG. 10 illustrates an example computing module that may be used in implementing various features of various embodiments of the disclosed technology. Several embodiments are described in terms of this example-computing module 1000. After reading this description, it will become apparent to a person skilled in the relevant art how to implement the technology using other computing modules or architectures.

Referring now to FIG. 10, computing module 1000 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, wireless access points (WAPs), terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A flood sensing unit comprising:
   a lower body portion coupled to a first power source, wherein the lower body portion comprises a controller, a submerged first pressure sensor, and a transceiver;
   an upper body portion coupled to a second power source and releasably disposed on the lower body portion, wherein the upper body portion comprises an antenna to communicate information via a network, and a second pressure sensor; and
   the controller of the lower body portion is configured to be connected to the submerged first pressure sensor that is submerged under water.

2. The flood sensing unit of claim 1, wherein the first power source comprises:
   a plurality of solar cells on at least three discrete surfaces of the lower body portion of the flood sensing unit and the second power source comprises a solar cell on a surface of the upper body portion of the flood sensing unit.

3. The flood sensing unit of claim 2, wherein the plurality of solar cells comprises:
   three solar cells configured to be mounted perpendicular to the ground and each solar cell facing a general direction of the sun, wherein the general direction of the sun is south when the flood sensing unit is in the northern hemisphere and north when the flood sensing unit is in the southern hemisphere; and
   the solar cell on the surface of the upper body portion configured to be faced in alignment with one of the solar cells.

4. The flood sensing unit of claim 3, wherein the plurality of solar cells further comprises:
   a first solar cell of the three solar cells mounted perpendicular to the direction of the sun;
   a second solar cell of the three solar cells mounted 30 degrees east of the first solar panel;
   a third solar cell of the three solar cells mounted 30 degrees west of the first solar panel; and
   the first solar cell mounted between the second solar cell and the third solar cell.

5. The flood sensing unit of claim 2, wherein the first power source and the second power source configured to power a battery pack enclosed in the lower body portion.

6. The flood sensing unit of claim 1, wherein the controller comprises:
   a controller module, the controller module configured to receive a plurality of inputs, wherein the plurality of inputs comprises a camera module input, an auxiliary power input, a SDI-12 compatible device input, the submerged first pressure sensor input, and the second pressure sensor input.

7. The flood sensing unit of claim 1, wherein the antenna receives signals from satellite or cellular communications.

8. A flood sensing system comprising:
   a housing comprising a base configuration comprising a transceiver, a first power source and a controller module, the housing further configured to releasably mount to a substrate structure via a mounting plate module, the controller module configured to receive flood data from a plurality of inputs comprising a pressure sensor input and at least one of a camera module input, an auxiliary power input, and a SDI-12 compatible device input;
   a communications module configured to releasably couple to the housing, the communications module comprising a second power source and configured to transmit and receive satellite or cellular communications; and
   one or more flood sensing units configured to receive the flood data from the housing via the transceiver, each flood sensing unit having a transceiver configured to transmit and receive line-of-sight mesh radio communications.

9. The flood sensing system of claim 8, wherein the mounting plate module comprises:
   a mounting plate configured to be attached to the substrate structure, wherein the mounting plate is mounted independent of the housing; and
   the attached mounting plate is configured to integrate with the controller module of the housing.

10. The flood sensing system of claim 8, wherein the pressure sensor input comprises:
    first pressure input from a first sensor at a location above a flood level and second pressure input from a second sensor at a location below the flood level.

11. The flood sensing system of claim 10, wherein the second sensor comprises:
    an elongated cable configured to provide power and data and coupling the base configuration and the second sensor.

12. The flood sensing system of claim 8, wherein the first power source comprises:
    a plurality of solar cells on at least three discrete surfaces of the lower body portion of the flood sensing unit and the second power source comprises a solar cell on a surface of the upper body portion of the flood sensing unit.

13. The flood sensing system of claim 12, wherein the plurality of solar cells comprises:
    three solar cells configured to be mounted perpendicular to the ground and each solar cell facing a general direction of the sun, wherein the general direction of the sun is south when the flood sensing unit is in the northern hemisphere and north when the flood sensing unit is in the southern hemisphere; and the solar cell on the surface of the upper body portion configured to be faced in alignment with one of the solar cells.

14. The flood sensing system of claim 13, wherein the plurality of solar cells further comprises:

a first solar cell of the three solar cells mounted perpendicular to the direction of the sun;

a second solar cell of the three solar cells mounted 30 degrees east of the first solar panel;

a third solar cell of the three solar cells mounted 30 degrees west of the first solar panel; and the first solar cell mounted between the second solar cell and the third solar cell.

15. A method for measuring water depth, comprising:

receiving, at a flood sensing unit, at least one atmospheric pressure measurement from a first sensor;

receiving, at the flood sensing unit, at least one submerged pressure measurement from a second sensor;

determining, via the flood sensing unit, a provisional water depth measurement based on the at least one atmospheric pressure measurement and the at least one submerged pressure measurement;

receiving, at the flood sensing unit, at least one water surface pressure measurement from the second sensor;

calculating, via the flood sensing unit, a calibration factor based on the at least one water surface pressure measurement, the at least one atmospheric pressure measurement, and the at least one submerged pressure measurement;

applying, via the flood sensing unit, the calibration factor to the provisional water depth measurement; and determining, via the flood sensing unit, an adjusted water depth based on the applied calibration factor.

16. The method of claim 15, further comprising storing the calibration factor at the flood sensing unit and applying the stored calibration factor to subsequent water depth measurements.

* * * * *